(12) United States Patent
McCarthy et al.

(10) Patent No.: US 12,026,389 B1
(45) Date of Patent: Jul. 2, 2024

(54) IDENTIFYING THE BEST TIME TO SCHEDULE A MIGRATION BASED ON SOURCE AND TARGET SYSTEM LOAD

(71) Applicant: Dell Products L.P., Hopkinton, MA (US)

(72) Inventors: Jason McCarthy, Cambridge, MA (US); Girish Warrier, Natick, MA (US); Rongnong Zhou, South Grafton, MA (US)

(73) Assignee: Dell Products L.P., Hopkinton, MA (US)

( * ) Notice: Subject to any disclaimer, the term of this patent is extended or adjusted under 35 U.S.C. 154(b) by 52 days.

(21) Appl. No.: 18/161,929

(22) Filed: Jan. 31, 2023

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/0673* (2013.01)

(58) Field of Classification Search
None
See application file for complete search history.

(56) References Cited

U.S. PATENT DOCUMENTS 11,294,584 B1 * 4/2022 McCarthy ............. G06F 3/0683
2023/0064808 A1 * 3/2023 Thubert .............. H04L 43/0876

* cited by examiner

*Primary Examiner* — Daniel D Tsui
(74) *Attorney, Agent, or Firm* — Anderson Gorecki LLP (57) ABSTRACT

Data migration between a source storage system and a target storage system is automated by calculating the optimal time window or group of consecutive time windows in which to execute the data migration, where optimality is defined in terms of source storage system and target storage system utilizations combined in a manner that accounts for differences between the source storage system and target storage system utilizations. Source and target storage system utilization scores are calculated for each of a plurality of time windows of at least one representative time period. A source-target load score is calculated for each of the time windows based on the source storage system utilization scores and the target storage system utilization scores. At least one of the time windows is selected based on the source-target load scores.

20 Claims, 6 Drawing Sheets

| Bucket | Two week average Values |
|---|---|
| 0 | (Σ KPI Values*Weights for Weeks n & n-1; bucket 0 data) / ((Σ Weights for Weeks n & n-1; bucket 0 data) |
| 1 | (Σ KPI Values*Weights for Weeks n & n-1; bucket 1 data) / ((Σ Weights for Weeks n & n-1; bucket 1 data) |
| 2 | (Σ KPI Values*Weights for Weeks n & n-1; bucket 2 data) / ((Σ Weights for Weeks n & n-1; bucket 2 data) |
| ... | ... |
| 40 | (Σ KPI Values*Weights for Weeks n & n-1; bucket 40 data) / ((Σ Weights for Weeks n & n-1; bucket 40 data) |
| 41 | (Σ KPI Values*Weights for Weeks n & n-1; bucket 41 data) / ((Σ Weights for Weeks n & n-1; bucket 41 data) |

IDENTIFYING THE BEST TIME TO SCHEDULE A MIGRATION BASED ON SOURCE AND TARGET SYSTEM LOAD

TECHNICAL FIELD

The subject matter of this disclosure is generally related to data storage systems.

BACKGROUND

A typical data center includes data storage nodes that support clusters of host servers. Instances of host applications, such as software for email, e-business, accounting, inventory control, manufacturing control, and engineering, run on the host servers. Host application data is maintained by the data storage nodes, examples of which may include storage area networks (SANs), storage arrays, network-attached storage (NAS) servers, and converged direct-attached storage (DAS), for example, and without limitation. Migration of host application data between storage nodes may be necessary or desirable for various reasons, possibly including, but not limited to, load balancing, maintenance, and replacement of equipment. Currently, data migrations are manually planned.

SUMMARY

A method in accordance with some implementations comprises: calculating a source storage system utilization score for each of a plurality of time windows of at least one representative time period; calculating a target storage system utilization score for each of the time windows; calculating a source-target load score for each of the time windows based on the source storage system utilization scores and the target storage system utilization scores; selecting at least one of the time windows based on the source-target load scores; and migrating data in the selected at least one time window.

An apparatus in accordance with some implementations comprises: a migration source storage system; a migration target storage system; and a management program configured to: calculate a source storage system utilization score for each of a plurality of time windows of at least one representative time period; calculate a target storage system utilization score for each of the time windows; calculate a source-target load score for each of the time windows based on the source storage system utilization scores and the target storage system utilization scores; select at least one of the time windows based on the source-target load scores; and prompt migration of data in the selected at least one time window.

In accordance with some implementations, a non-transitory computer-readable storage medium stores instructions that when executed by a storage system cause the storage system to perform a method comprising: calculating a source storage system utilization score for each of a plurality of time windows of at least one representative time period; calculating a target storage system utilization score for each of the time windows; calculating a source-target load score for each of the time windows based on the source storage system utilization scores and the target storage system utilization scores; selecting at least one of the time windows based on the source-target load scores; and migrating data in the selected at least one time window.

This summary is not intended to limit the scope of the claims or the disclosure. Other aspects, features, and implementations will become apparent in view of the detailed description and figures, and all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
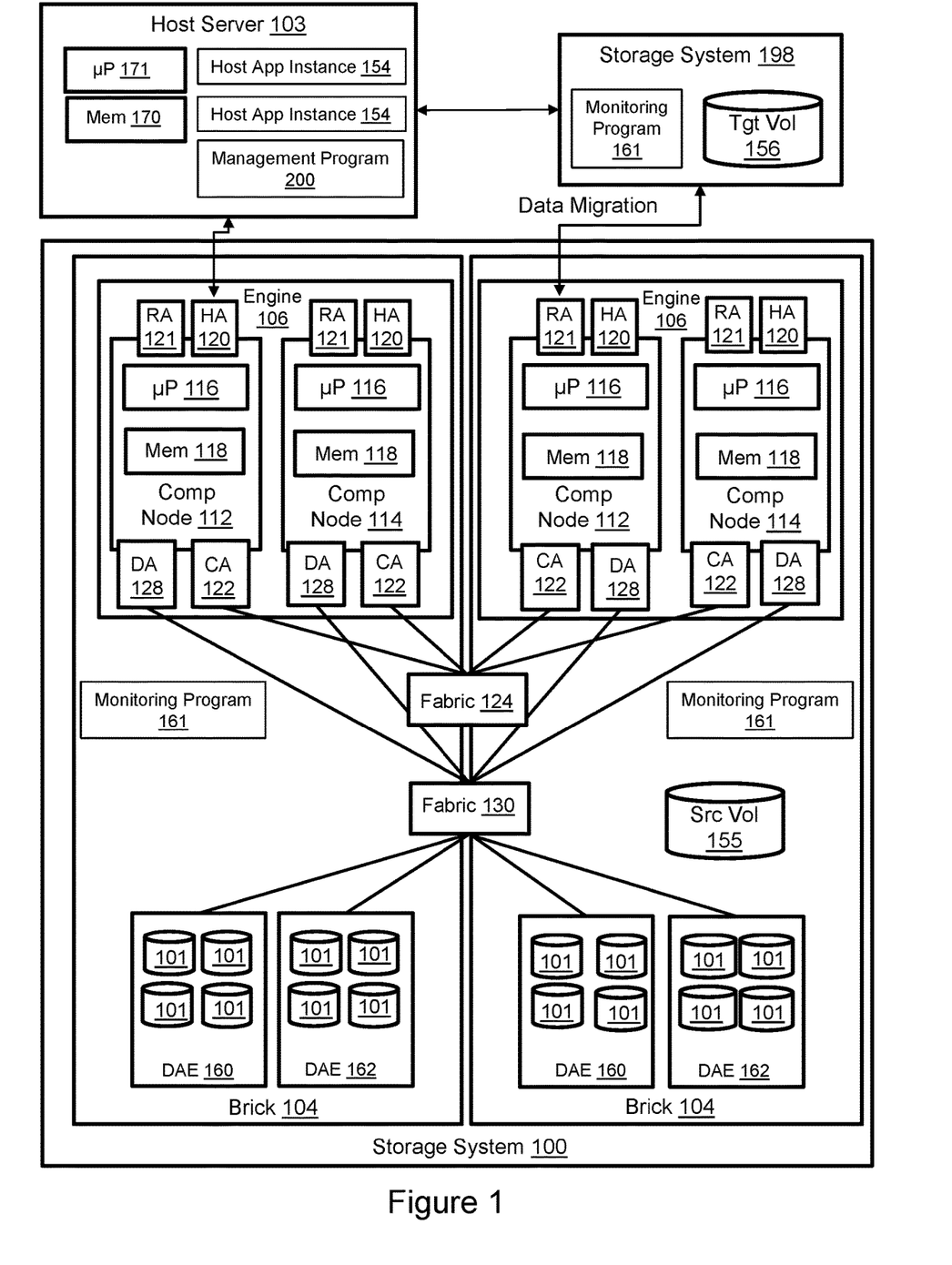
FIG. 1 illustrates a simplified data center environment in which a management program selects one or more consecutive time windows for data migration between storage systems based on source and target loading.

FIG. 1 illustrates a simplified data center environment with two storage systems 100, 198 and a host server 103. The host server runs a management program 200 that automates selection of a time window or set of consecutive time windows for data migration based on source and target loading, where storage system 100 and storage system 198 are the migration source and target, respectively. Storage system 100 and storage system 198 may be any type of storage systems, including, but not limited to, storage arrays, SANs, NAS, and converged DAS. The host server 103, of which there may be many, includes volatile memory 170 and one or more tangible processors 171. The memory and processors are used to run host application instances 154, of which management program 200 may be a part in some implementations. Examples of host applications may include, for example, and without limitation, software for email, e-business, accounting, inventory control, manufacturing control, and engineering. The host application instances may run on virtual machines under a hypervisor or in containers. Instances of host applications may prompt generation of input-output commands (IOs) to read and/or write host application data that is maintained by the storage systems 100, 198.

Storage system 100 is depicted as a storage array. A storage array includes one or more bricks 104. Each brick includes an engine 106 and one or more disk array enclosures (DAEs) 160, 162. Each engine 106 includes a pair of interconnected compute nodes 112, 114 that are arranged in a failover relationship and may be referred to as "storage directors." Although it is known in the art to refer to the compute nodes of a storage array or SAN as "hosts," that naming convention is avoided in this disclosure to help distinguish the host server 103 from the compute nodes 112, 114. Nevertheless, the host applications could run on the compute nodes. Each compute node includes hardware resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array. Each compute node includes one or more front-end host adapters (HAs) 120 for communicating with host servers. Each host adapter has resources for servicing input-output commands (IOs) from the host servers. The host adapter resources may include processors, volatile memory, and ports via which the hosts may access the storage array. Each compute node also includes a front-end remote adapter (RA) 121 with Remote Data Forwarding (RDF) ports for communicating with other storage systems such as storage system 198, e.g., for data replication and data migration. Each compute node also includes one or more back-end disk adapters (DAs) 128 for communicating with managed drives 101 in the DAEs 160, 162. Each disk adapter has processors, volatile memory, and ports via which the compute node may access the DAEs for servicing IOs. Each compute node may also include one or more back-end channel adapters (CAs) 122 for communicating with other compute nodes via an interconnecting fabric 124. The managed drives 101 include non-volatile storage media that may be of any type, e.g., including one or more types such as solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations, every disk adapter 128 in the storage array can reach every DAE via the fabric 130. Further, in some implementations every disk adapter in the storage array can access every managed disk 101.

Host application data is maintained on the managed drives 101. Because the managed drives are not discoverable by the host servers, the storage array creates logical storage objects such as source volume 155 that can be discovered by the host servers. Without limitation, storage objects may be referred to as volumes, devices, or LUNs, where a logical unit number (LUN) is a number used to identify logical storage volumes in accordance with the small computer system interface (SCSI) protocol. From the perspective of the host servers, each production storage object is a single disk having a set of contiguous fixed-size logical block addresses (LBAs) on which data used by the instances of a host application resides. However, the host application data is stored at non-contiguous addresses on various managed drives 101. Separate storage groups of production storage objects may be created for each host application. Consequently, storage groups can be used to represent host applications in workload and storage capacity utilization calculations. The compute nodes 112, 114 maintain metadata that maps between the LBAs of the production storage objects and physical addresses on the managed drives 101 in order to process IOs from the host application instances.

In order to migrate the data stored on source volume 155 to storage system 198, a target volume 156 is created on storage system 198. The data is then written from the source volume 155 to the target volume 198 via the RDF ports. However, the IOs associated with writing the data may present a significant change in loading on both storage systems 100, 198, each of which may have different configurations and time-varying workloads such that one of the storage systems may be heavily loaded at the same time that the other storage system is lightly loaded. In order to facilitate efficient and non-disruptive migration of the data, the management program 200 identifies a time window or set of consecutive time windows of relatively low projected loading that is common to both storage systems and prompts the storage systems to perform the data migration during that time window or set of consecutive time windows.

Figure 2:
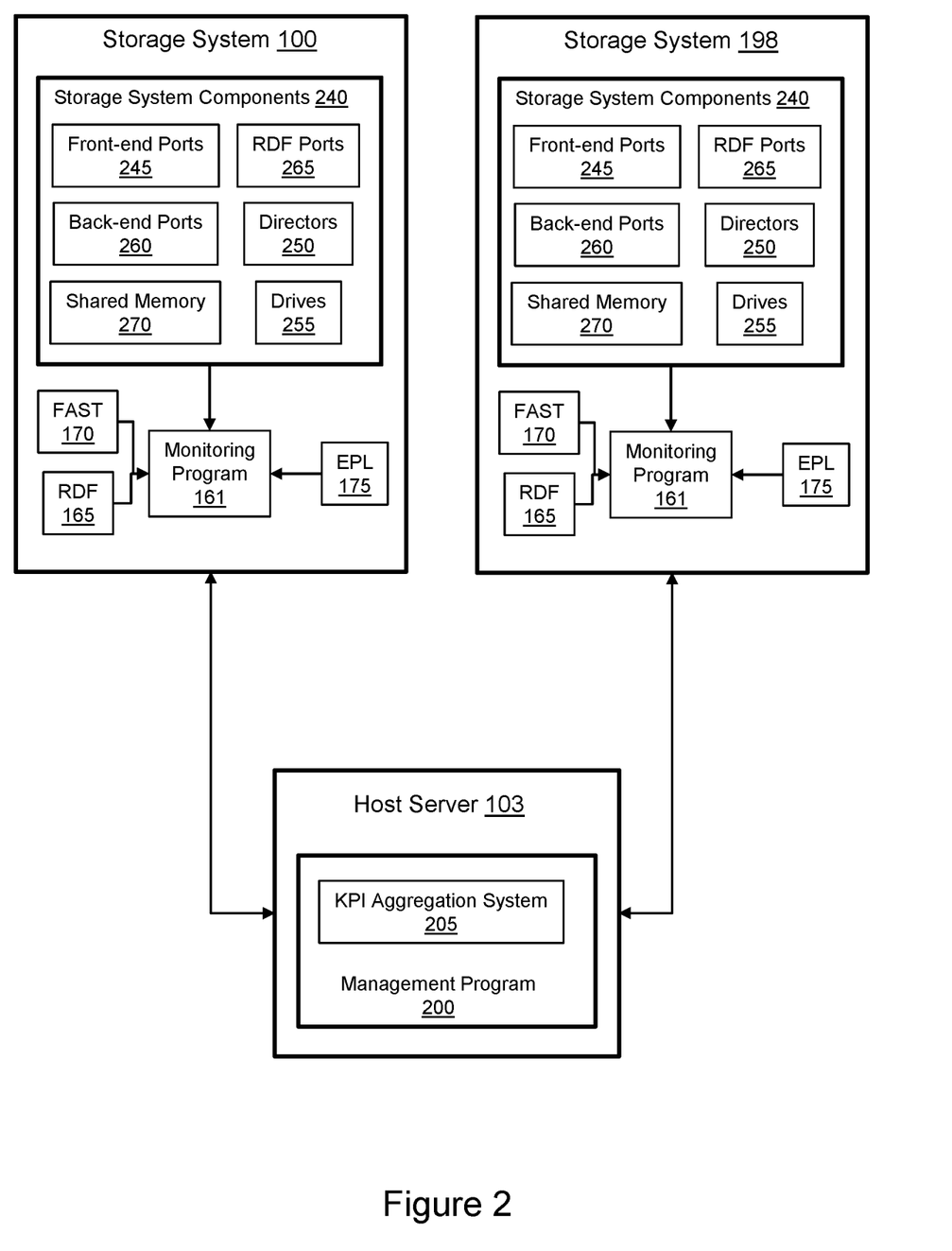
FIG. 2 illustrates aspects of performance data collection in greater detail.

Referring to FIGS. 1 and 2, performance monitoring programs 161 running on the storage systems 100, 198 gather performance data from storage system hardware components 240 possibly including, but not limited to, front-end ports 245, directors 250, drives 255, back-end ports 260, RDF ports 265, and shared memory 270. The performance monitoring programs also gather current utilization and performance data from software system components such as Fully Automated Storage Tiering (FAST) processes 170, RDF processes 165, and an essential performance library (EPL) 175. The performance monitoring programs 161 on each of the storage systems periodically report the current utilization and performance data to the management program 200 on host server 103.

Management program 200 includes a Key Performance Indicator (KPI) aggregation system 205 that uses the current utilization and performance data to create performance characterizations of the storage system components 240. The performance characterizations may be represented by component KPI data structures. The KPI aggregation system 205 distills reported current utilization and performance data from the monitoring programs 161 into sets of 42 four-hour buckets, in which each bucket contains a weighted average KPI value for the respective four-hour interval. Using 42 four-hour interval buckets enables the KPI aggregation system 205 to characterize the fluctuation of a given KPI value over the course of a week, which may be a suitable period of time for characterization of time-varying load patterns. Additional information regarding the KPI aggregation system 205 is described in U.S. Pat. No. 11,294,584, entitled Method and Apparatus for Automatically Resolving Headroom and Service Level Compliance Discrepancies, the content of which is hereby incorporated herein by reference.

Figure 3:
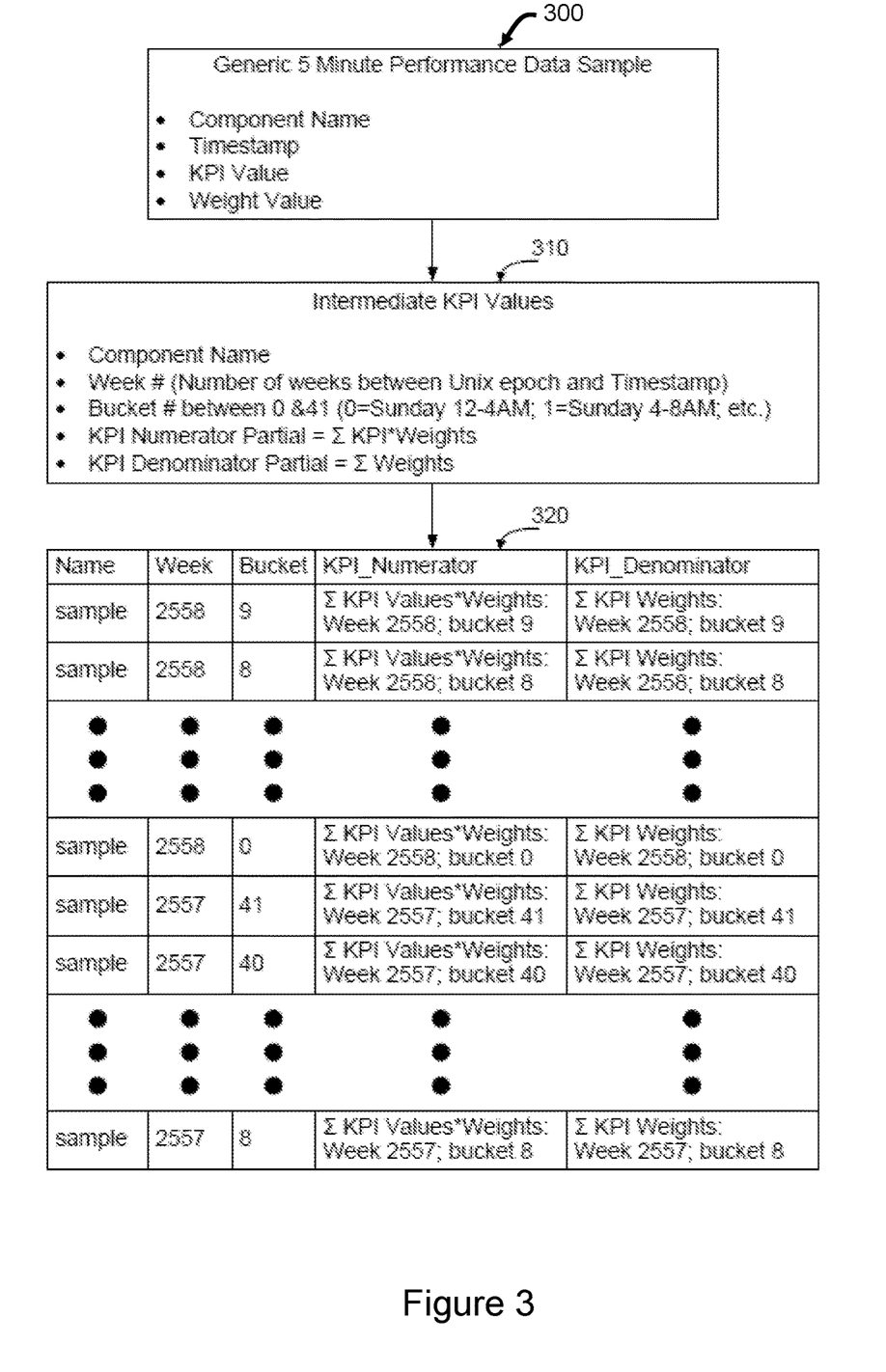
FIGS. 3 and 4 are functional block diagrams of a set of data structures used to represent performance data.

FIG. 3 is a functional block diagram of several example KPI data structures that are used to aggregate KPI data. Each monitoring interval in the illustrated example is four hours long, but other monitoring intervals may be used depending on the implementation. For a monitoring interval of four hours in length, a set of 42 buckets is sufficient to describe the performance of the storage system over the course of a given week. Where buckets of other time lengths are used, a different number of buckets would be used to characterize the performance of the storage system over the course of a week. Bucket 0 is assigned to the window of time starting at midnight on Sunday and ending at 4 AM Sunday morning. Bucket #1 is assigned to the window of time starting at 4 AM Sunday morning and ending at 8 AM Sunday morning. The buckets are consecutively numbered in this manner throughout the week. Other implementations may assign the buckets differently. An example sampling interval is five minutes, although other sampling intervals could be used. The information contained in the data sample is stored in a performance sample data structure 300. Example performance data includes the component name, a timestamp, the KPI value, and a weight value.

An intermediate KPI values data structure 310 includes the component name and the week number, which in the illustrated example is the number of weeks between the Unix epoch (Jan. 1, 1970) and the timestamp. The intermediate KPI values data structure 310 also specifies the bucket number. The management program maintains a separate intermediate values data structure 310 for each reported KPI. The intermediate KPI values data structures are used to calculate a KPI numerator partial value=KPI value*Weight, and a KPI denominator partial value=Weight. As performance data samples 300 are received, the KPI numerator and KPI denominator are updated by aggregating the information from the performance data samples into previously received aggregated data for the monitoring interval.

The intermediate KPI values data is aggregated to form aggregate KPI values data structure 320 at the end of the monitoring interval. Once the end of the monitoring interval occurs, the final KPI numerator partial value and final KPI denominator partial value are copied to the aggregate KPI values data structure 320, and the intermediate values data structure 310 is reset for use in connection with a subsequent monitoring interval. In some embodiments, aggregate KPI values data structure 320 is a data structure containing a rolling six weeks of buckets of data. The management program uses two weeks of performance data for calculations but retains six weeks for historical/debug purposes. The time series historical data for the storage systems maintained in the aggregate KPI values data structure 320 is used to calculate when to perform a data migration.

Figure 4:
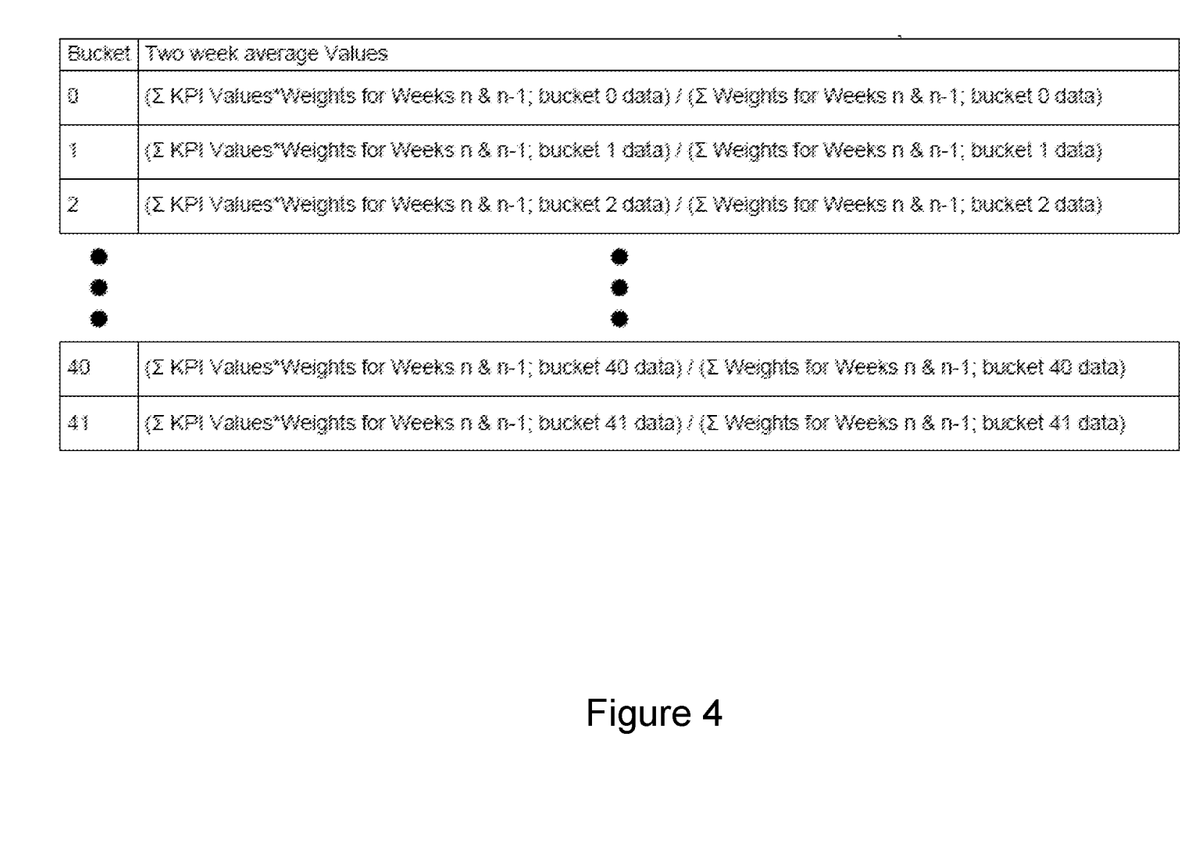

In some embodiments, some of the rules are based on average KPI values in a given bucket number over a previous two-week interval. Accordingly, as shown in FIG. 4, in some embodiments a KPI average data structure 400 is populated with average KPI values over the two-week interval. Since the same bucket number occurs at the same time each week, averaging the bucket values in this manner enables the average KPI value for the storage system to be determined for a particular four-hour window of time over the two-week evaluation period.

Figure 5:
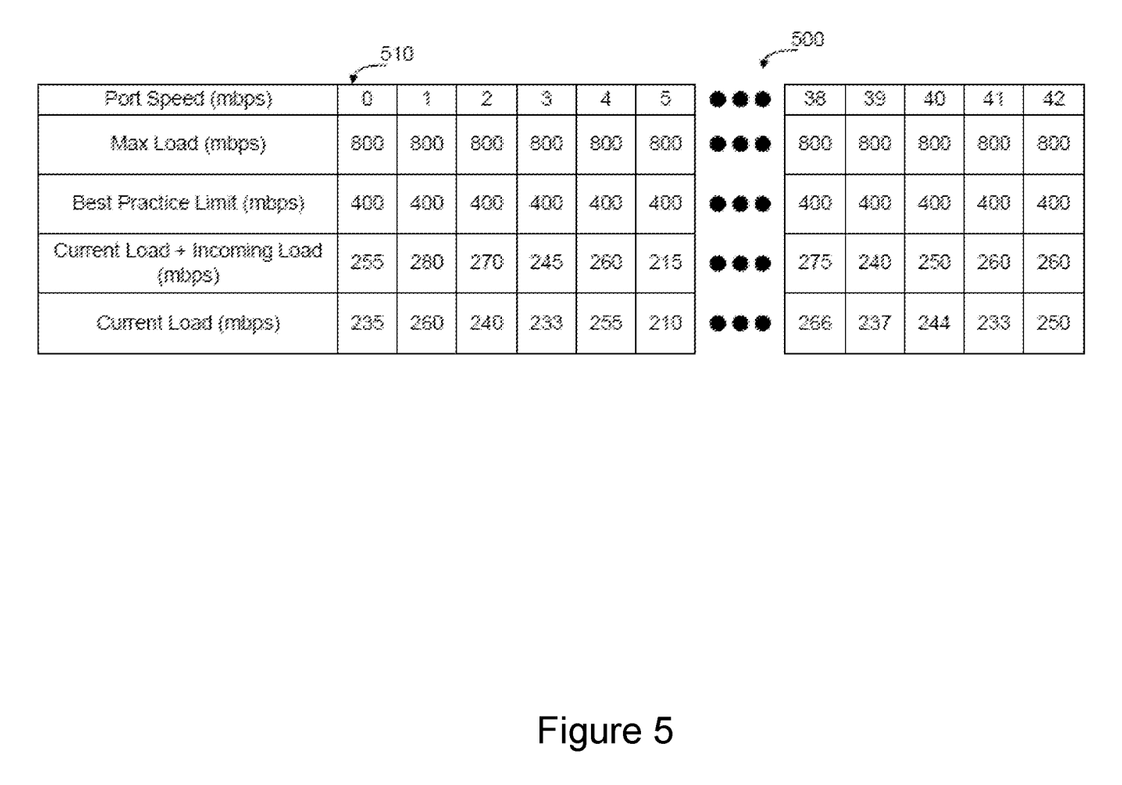
FIG. 5 illustrates fluctuation of an example key performance indicator over a two-week period of time.

FIG. 5 is a functional block diagram of an example data structure 500 containing an example set of bucket values 510 for one week worth of buckets (42 buckets: columns labeled 0-41). The values represent port speed in mega-bits per second (mbps). Other similar data structures would contain other KPI data. There is a negotiated maximum load on the port of 800 mbps (row 1). In this instance, the negotiated maximum load is constant across all buckets. The best practice limit in this example is set to 50% of the maximum load (row 2). Accordingly, the best practice limit in this example is set at 400 mbps. The data structure also shows an example hypothetical amount of workload on the port over the past week based on the current amount of workload assigned to the storage system (row 4, labeled "Current Load"). The data structure also shows the expected amount of workload that would have been implemented on the port over the past week if the incoming load had been implemented by the storage system (row 3, labeled "Current Load+Incoming Load).

Referring again to FIG. 1, the management program 200 uses the data structures to calculate a time window or common set of consecutive time windows during which to execute the migration. For example, the management programs may identify the predicted combined least utilized time window or predicted combined least utilized set of consecutive time windows of both storage systems. A subset of metrics is used to create performance characterizations of storage system components as described above. Two weeks of data is condensed in such a way as to minimize the amount of data required, but to maintain a representative "shape" of the workload changes over time. Bucketized system configuration data and performance data are used to calculate a storage system growth factor for each of the 42 time buckets. The growth factor is a multiplier representing "how much more" of the existing storage system workload could be added without surpassing a system component's "best practice" performance threshold. The greater the growth factor, the greater the additional workload that can be accepted by the storage system. An overall storage system utilization for each window of each storage system is calculated from the inverse of the growth factor.

To identify the least utilized bucket relative to both storage systems, and thus the least utilized time window, the system utilizations for both the source and target storage systems are summed for each time window. A delta that is the absolute value of the difference between the source and target storage system utilizations for that time window is then added to the sum to yield a load score for the time window. The calculations are performed separately for each four-hour time window as follows:

$$util\_src = \text{Source System Utilization};$$

$$util\_tgt = \text{Target System Utilization; and}$$

$$\text{Load Score} = util\_src + util\_tgt + |(util\_src - util\_tgt)|.$$

The delta is added to the sum of the utilizations to account for differences between the source storage system and target storage system utilization values. In a first window in which the source storage system is 50% utilized and the target storage system is 50% utilized, the sum of the utilizations is 100 and both storage systems are equally capable of supporting the migration. In contrast, for a second window in which the source storage system is only 20% utilized and the target storage system is 80% utilized, the sum of the utilizations is still 100, but starting a data migration might be inadvisable in a time window in which one of the storage systems is already 80% utilized. The delta helps to differentiate between such time windows. Applying the delta to the sum of the example above yields a load score of 100 (50+50+0) for the first window and a load score of 160 (50+50+(80−20)) for the second window, thereby indicating the first window is more suitable for data migration than the second window.

In the event that a data migration will not be completed within a single window, the calculations are adjusted to identify a set of consecutive time windows. To account for multiple four-hour buckets, for example, the equation for each bucket changes to:

$$\Sigma Load\_Score\_i \text{ from } n \text{ to } t,$$

where:
n=The starting bucket ID;
t=n+m if (n+m)≤41, t=n+m−41 if (n+m)>41;
m=The number of consecutive buckets the load score should consider; and
Load Score_i=util_src_i+util_tgt_i+|(util_src_i−util_tgt_i)|

Because the representative 42 bucket workload repeats, if n+m>41, then the upper limit (t) of the summation wraps back around using (n+m)−41.

Figure 6:
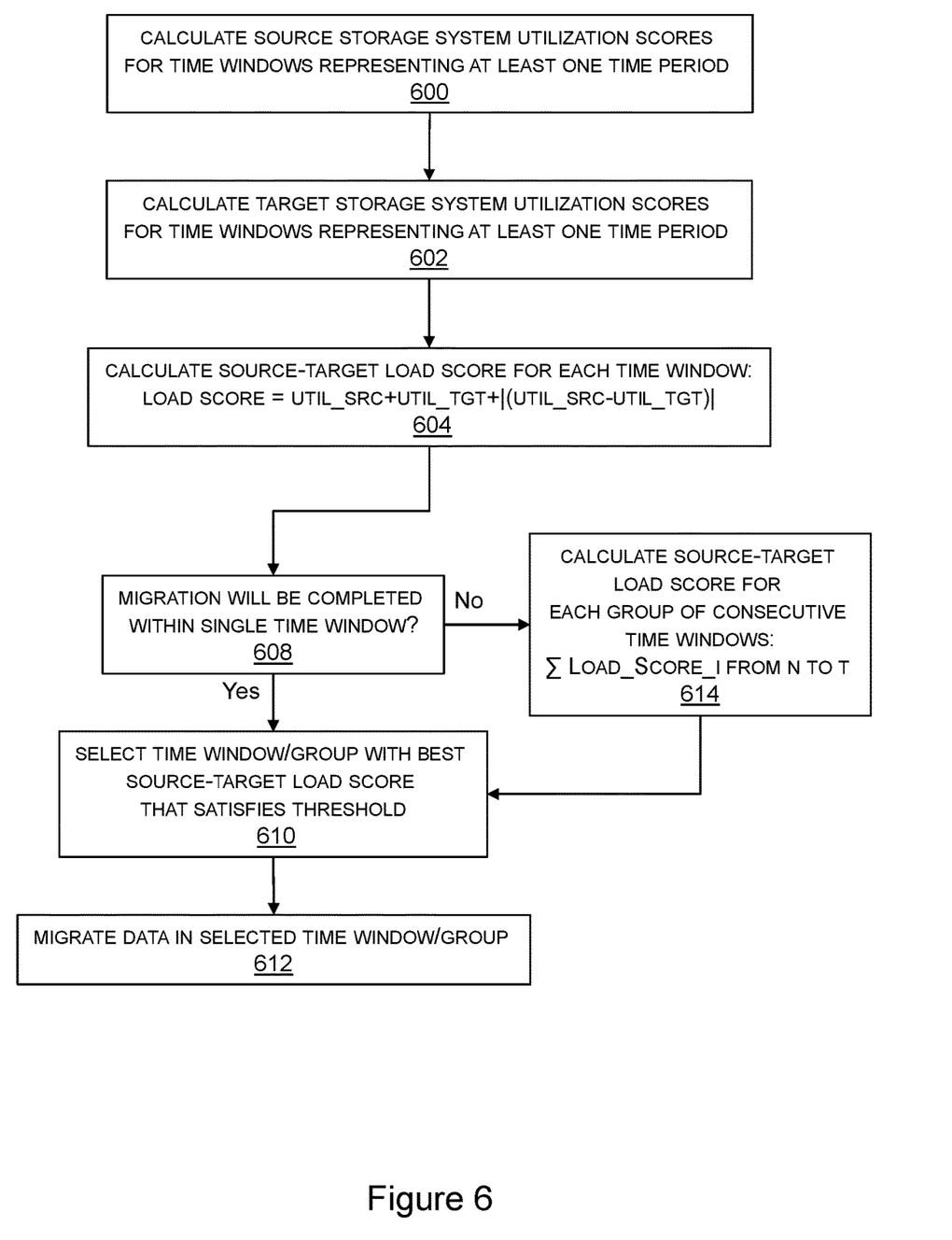
FIG. 6 illustrates a method in accordance with aspect of the presently disclosed invention.

FIG. 6 illustrates a method in accordance with aspect of the presently disclosed invention. Step 600 is calculating source storage system utilization scores for each time window of at least one representative time period. Data from multiple time periods may be included. Step 602 is calculating target storage system utilization scores for each time window of at least one representative time period. Data from multiple time periods may be included. Step 604 is calculating a source-target load score for each time window in the time period, e.g., each four-hour window in a one-week time period. The source-target load score for each time window is calculated as: load score=util_src+util_tgt+|(util_src−util_tgt)|. If the migration will be completed within a single time window as determined in step 608, then step 610 is selecting the time window with the best source-target load score that satisfies a threshold. The time window with the best source-target load score is indicated by the lowest load score. However, a threshold may be set such that migration is not started when even the lowest load score indicates utilization that is too high to add data migration. If the migration will not be completed within a single time window as determined in step 608, then step 614 is calculating source-target load scores for groups of consecutive windows in which the migration can be accomplished. The load score for each time window is calculated as Load Score_i=util_src_i+util_tgt_i+|(util_src_i-util_tgt_i)| and the values are summed to yield the load score for the group as ΣLoad_Score_i from n to t, where:

n=The starting bucket ID;
t=n+m if (n+m)≤41, t=n+m−41 if (n+m)>41; and
m=The number of consecutive buckets the load score should consider, i.e., the number of windows needed to complete the migration. The upper limit (t) of the summation wraps back around using (n+m)−41 if n+m>41. The group of consecutive time windows with the best source-target load score that satisfies a threshold is selected in step 610. Step 612 is migrating the data in the selected window or group of consecutive windows.

While advantages should not be considered as limitations, at least some implementations can advantageously help to automate selection of the optimal time window or group of consecutive time windows in which to execute a data migration, where optimality is defined in terms of projected source storage system and target storage system utilizations combined in a manner that accounts for differences between the source storage system and target storage system utilizations.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:
1. A method comprising:
    calculating a source storage system utilization score for each of a plurality of time windows of at least one representative time period;
    calculating a target storage system utilization score for each of the time windows;
    calculating a source-target load score for each of the time windows based on the source storage system utilization scores and the target storage system utilization scores;
    selecting at least one of the time windows based on the source-target load scores; and
    migrating data in the selected at least one time window.
2. The method of claim 1 further comprising calculating the source-target load score for each time window as util_src+util_tgt+|(util_src−util_tgt)|, where util_src is the source storage system utilization score and util_tgt is the target storage system utilization score for the time window.
3. The method of claim 2 further comprising migrating data in the at least one selected time window responsive to the at least one selected time window having a source-target load score that satisfies a threshold.
4. The method of claim 1 further comprising calculating a source-target load score for each of a plurality of groups of consecutive time windows having a number of time windows required for data migration.
5. The method of claim 4 further comprising calculating the source-target load score for each of the plurality of groups of consecutive time windows as ΣLoad_Score_i from n to t, where n=The starting bucket ID, t=n+m if (n+m)≤41, t=n+m−41 if (n+m)>41, and m=the calculated number of time windows required for data migration.
6. The method of claim 5 further comprising selecting the group of consecutive time windows based on the source-target load scores.
7. The method of claim 6 further comprising migrating data in the selected group of consecutive time windows.
8. An apparatus comprising:
    a migration source storage system;
    a migration target storage system;
    a management program configured to:
        calculate a source storage system utilization score for each of a plurality of time windows of at least one representative time period;
        calculate a target storage system utilization score for each of the time windows;

calculate a source-target load score for each of the time windows based on the source storage system utilization scores and the target storage system utilization scores;

select at least one of the time windows based on the source-target load scores; and prompt migration of data in the selected at least one time window.

9. The apparatus of claim 8 further comprising the management program being configured to calculate the source-target load score for each time window as util_src+util_tgt+|(util_src−util_tgt)|, where util_src is the source storage system utilization score and util_tgt is the target storage system utilization score for the time window.

10. The apparatus of claim 9 further comprising the management program being configured to prompt migration of the data in the at least one selected time window responsive to the at least one selected time window having a source-target load score that satisfies a threshold.

11. The apparatus of claim 8 further comprising the management program being configured to calculate a source-target load score for each of a plurality of groups of consecutive time windows having a number of time windows required for data migration.

12. The apparatus of claim 11 further comprising the management program being configured to calculate the source-target load score for each of the plurality of groups of consecutive time windows as ΣLoad_Score_i from n to t, where n=The starting bucket ID, t=n+m if (n+m)≤41, t=n+m−41 if (n+m)>41, and m=the calculated number of time windows required for data migration.

13. The apparatus of claim 12 further comprising the management program being configured to select the group of consecutive time windows based on the source-target load scores.

14. The apparatus of claim 12 further comprising t the management program being configured to prompt migration of the data in the selected group of consecutive time windows.

15. A non-transitory computer-readable storage medium storing instructions that when executed by a storage system cause the storage system to perform a method comprising:

calculating a source storage system utilization score for each of a plurality of time windows of at least one representative time period;

calculating a target storage system utilization score for each of the time windows;

calculating a source-target load score for each of the time windows based on the source storage system utilization scores and the target storage system utilization scores;

selecting at least one of the time windows based on the source-target load scores; and migrating data in the selected at least one time window.

16. The non-transitory computer-readable storage medium of claim 15 in which the method further comprises calculating the source-target load score for each time window as util_src+util_tgt+|(util_src-util_tgt)|, where util_src is the source storage system utilization score and util_tgt is the target storage system utilization score for the time window.

17. The non-transitory computer-readable storage medium of claim 16 in which the method further comprises migrating data in the at least one selected time window responsive to the at least one selected time window having a source-target load score that satisfies a threshold.

18. The non-transitory computer-readable storage medium of claim 15 in which the method further comprises calculating a source-target load score for each of a plurality of groups of consecutive time windows having the calculated number of time windows required for data migration.

19. The non-transitory computer-readable storage medium of claim 18 in which the method further comprises calculating the source-target load score for each of the plurality of groups of consecutive time windows as ΣLoad_Score_i from n to t, where n=The starting bucket ID, t=n+m if (n+m)≤41, t=n+m−41 if (n+m)>41, and m=the calculated number of time windows required for data migration.

20. The non-transitory computer-readable storage medium of claim 19 in which the method further comprises selecting the group of consecutive time windows based on the source-target load scores.

* * * * *